United States Patent [19]
Brown

[11] Patent Number: 5,398,508
[45] Date of Patent: Mar. 21, 1995

[54] THREE DISPLACEMENT ENGINE AND TRANSMISSION SYSTEMS FOR MOTOR VEHICLES

[76] Inventor: Arthur E. Brown, R.D. #1 Box 1107, Lake George, N.Y. 12845

[21] Appl. No.: 846,172

[22] Filed: Mar. 5, 1992

[51] Int. Cl.⁶ ............................................. F02B 73/00
[52] U.S. Cl. ........................................ 60/718; 74/661; 180/69.6; 123/DIG. 8
[58] Field of Search .................... 60/716, 717, 718; 123/DIG. 8; 180/69.6; 74/661

[56] References Cited

U.S. PATENT DOCUMENTS

| | | | |
|---|---|---|---|
| 2,366,646 | 1/1945 | Orr | 60/718 X |
| 4,421,217 | 12/1983 | Vagias | 60/718 X |
| 4,480,612 | 11/1984 | Yamakawa | 60/718 X |
| 4,481,841 | 11/1984 | Abthoff et al. | 60/718 X |
| 4,566,279 | 1/1986 | Kronogard | 60/718 |
| 4,638,637 | 1/1987 | Kronogard | 60/718 |
| 4,662,490 | 5/1987 | Yamakawa | 74/661 X |

*Primary Examiner*—Stephen F. Husar

[57] ABSTRACT

A main internal combustion engine powers a motor vehicle at 55 MPH. A smaller auxiliary engine powers the vehicle at slower speed. Both engines power at the same time for passing, hill climbing, etc. Either engine can be shut down (or idled) while the other engine powers. Thus, the engines operate more closely to best efficiency and this shall result in reduced fuel consumption (as calculated herein) and less air pollution.

In a first species, the main engine transmits shaft power through a standard friction clutch and then to an ordinary transaxle consisting of torque converter, automatic transmission and differential. The auxiliary engine is mounted next to the transmission. Power from the smaller engine passes through an overrunning clutch and then by toothed belt and sprockets to the torque converter.

A second species is identical to the first except an over running clutch takes the place of the friction clutch.

In a third species, the main engine, main clutch, and transaxle are standard items mounted in the same location as in present single engine cars.

21 Claims, 8 Drawing Sheets

THREE DISPLACEMENT ENGINE AND TRANSMISSION SYSTEMS FOR MOTOR VEHICLES

INTRODUCTION

The power required to propel modern medium size cars on a level road at 55 MPH (steady speed) is about 26 engine horsepower. At 25 MPH it is 5 H. P. Thus, present car engines spend most of their time operating at low power output where fuel economy is poor due to inlet air throttling, poor combustion, and more engine friction than necessary.

Refer to the book, "The Internal Combustion Engine in Theory and Practice", Volume I, 2nd Edition by Professor Charles Fayette Taylor, the M. I. T. Press, Massachusetts Institute of Technology. Read the whole book but pay close attention to FIG. 12-11 which relates fuel economy at full load and part load; and see FIG. 12-16 which shows how fuel economy is related to brake mean effective pressure (B. M. E. P.) and piston speed. Refer also to pages 447 and 453 where Professor Taylor discusses and calculates the effect of gear ratio on fuel economy.

It is known that an internal combustion engine has best fuel economy at full load, high B. M. E. P., and low piston speed. It is possible to raise B. M. E. P. and lower piston speed by going to a high gear ratio. However, at only 25 MPH in stop and go city traffic and with a single big engine, the gear ratio would get so high as to be impractical.

Have you ever driven a car with a 5 speed manual transmission? As a driver, you soon learn not to go into 5th gear in city type driving. This is because the engine chugs along unsmoothly and with sluggish acceleration.

At 25 MPH, the best way to raise B. M. E. P. (and the fuel economy) is to go to a small auxiliary engine and run it in a low enough gear so as to keep the engine RPM high enough for smooth running and good acceleration. Further, that small engine will be closer to full load compared to a 150 HP single engine; and therefore its fuel economy will be better and with less air pollution.

At 55 MPH, run on the main engine alone and with a fairly high gear ratio so as to improve fuel economy at that speed also. When you need more power for passing or hill climbing, make the simple conversion to two engine power effortlessly and on the fly.

All engines illustrated herein are for both four stroke cycle and two stroke cycle interchangably.

DISCUSSION OF PRIOR ART

A good place to look for prior art (at the U.S. Patent Office) is in the examiner's search room under class 123 (internal combustion engines), digest 8 (multi-engine). The most pertinent prior art found was U.S. Pat. No. 4,638,637 Kronogard, et al. All of the prior art patents cited herein have provision for only two (not three) displacements. Kronogard 637 teaches a ⅓ plus ⅔ power ratio but does it with a supercharger 23 and not by three displacements (column 2, lines 61 to 68 and column 3, lines 1 to 8). Kronogard shows and specifies two equal size cylinders for each crankshaft (Column 2, line 63). Ormsby 2290703 has what he calls a "booster engine" 25 and that is all it is a booster. Ormsby does not mention (in 703) anything about running his engine 25 all by itself. In fact, Ormsby drives his sole water pump only when his main engine is running as can be seen in Ormsby's FIG. 3 and specified on page 2, column 2, lines 3 to 8. Further, the Ormsby booster engine powers solely through an over-running clutch 29 and does not have a friction clutch or torque converter for use with the booster engine. This means therefore, that the Ormsby booster engine 25 cannot (by itself) start the vehicle from a dead stop, because internal combustion engines require a slip clutch of some sort to start a load. Further, Ormsby does not provide a compact two engine power plant capable of being located in the engine compartment of a passenger car.

The following U.S. Patents all teach the use of a positive jaw clutch between the ends of two crankshafts: General Motors Corp. U.S. Pat. No. 4,069,803, Volkswagon U.S. Pat. No. 4,373,481, and other U.S. Pat. Nos. 4,367,703, 4,368,701, 4,389,985, and 4,394,854. Those positive jaw clutches are prime candidates for failure due to: impact upon engagement, failure to release due to stiction, and failure of the hydraulic or electric actuating means for the jaw clutch. The worst drawback to those positive jaw clutches is their location deep down inside the engine where access for their many repairs would require removal of one or both crankshafts. Synchronizing means is required before the jaw clutch can be engaged; and patent 854 shows a friction clutch 4 (between cam shafts) for that purpose. The use of a jaw clutch (in these prior engines) would result in two special engines and no standard production engine could be used.

OBJECTS AND ADVANTAGES OF THIS INVENTION

1. The first object is to provide a power plant with two separate and distinct engines whereby each engine can start and power the vehicle by itself and wherein both engines can power at the same time for maximum power when needed. A further object is that one engine shall have approximately twice the displacement of the other engine so as to provide three levels of displacement.

2. A second object is to provide clutching and power transmission means such that each engine can start and power the vehicle by itself and wherein both engines can power at the same time for more power when needed.

3. Use the auxiliary engine by itself when low power is required such as in slow city driving and traffic tie ups.

4. At 55 MPH use only the main engine by itself and with a slightly higher gear ratio that in your average present car.

5. The advantage of paragraphs 1 to 4 is reduced fuel consumption both in city type slow driving and also at 55 MPH. The reduced fuel consumption also means reduced air pollution.

6. Run both engines under power at the same time when passing, hill climbing, etc. Thus my power plant is versatile; but does not have the continuous penalty of high fuel consumption (as with a single large engine).

7. Another object is to select an auxiliary engine which will fit under the hood of a passenger car or truck. Most existing engine compartments are already crammed. A related object was to find a location and drive method for such an engine—not an easy task.

8. Another object is to select an auxiliary engine which is well suited for the job. A two cylinder horizontal opposed engine is selected because (a) it has only two cylinders, (b) it fits well on top of the transmission, (c) it lays flat and permits a low hood line, (d) it has equally spaced power strokes and is thus smooth running, and (e) the reciprocating inertia forces are fairly well balanced, and (f) it is a common engine used in some motorcycles and this may lead to more rapid development.

9. A good combination is to use four cylinders for the main engine and two cylinders for the auxiliary. The reasons for a two cylinder auxiliary are: (a) It will have half as many cylinders as the main engine and this gives an equal spread of three displacements, and (b) the two cylinder horizontal opposed has many qualities as was described in previous paragraph 8.

The reasons for a four cylinder main engine are explained in paragraphs 10 to 13 following.

10. An advantage is that when cruising at 55 MPH, you are being powered by a single engine (not two engines). Further, that engine has four cylinders, is smooth running and powerful on its own. This is compared with General Motors U.S. Pat. No. 4,069,803 which has two crankshafts (serving a total of four cylinders) interconnected by a positive jaw clutch. Volkswagen U.S. Pat. No. 4,373,481 is the same. Which four cylinder engine would you rather have at 55 MPH—the G. M., the V. W., or my ordinary standard engine with the single crankshaft?

11. Another object (as shown in FIG. 4) is to take an existing car or truck which has a single engine, clutch, and transmission. Leave all those parts substantially intact and where they are now located in the vehicle. Then combine my smaller auxiliary engine with same. Even retrofit into existing vehicles appears possible in some cases. Thus, my invention can use said parts which are already in common use and high production; and it is not necessary to redesign, retest and gear up to manufacture these parts. This will save cost, time, and hard earned reliability.

12. The most popular four cylinder car engine today is the in-line 4, and the automobile giants are geared up to manufacture the in-line 4. Therefore, an object in FIG. 4 is to use the in-line 4.

13. FIGS. 1 and 3 use a clutch in addition to torque converter; and this increases the axial length of the power plant. In a front wheel drive vehicle, the power plant is mounted transversely and thus overall length is limited. Accordingly, I have selected a Vee 4 main engine for use in FIGS. 1 and 3 because the VEE 4 is compact in axial length.

14. Another object is to eliminate the need for a positive jaw clutch (between crankshafts) as taught by General Motors U.S. Pat. No. 4,069,803 or Volkswagen U.S. Pat. No. 4,373,481 and four other patents listed herein. My two engines do not need to run in phased relationship with each other hence no need for a positive jaw clutch. The elimination of that complex part leads to simplicity, reliability, compactness, and use of standard engines.

15. My power plant has a powerful two engine mode for passing other vehicles or for adding more power on a steep hill. This method is accomplished with no shifting of gears, no friction clutch operation, and no hesitation. This constitutes safety, simplicity, and convenience.

16. My power plant has two modes of operation which I refer to as the "idle mode" and the "shut down mode". In the idle mode, one engine idles over slowly while the other powers. The advantage of idling is that it is not necessary to restart that engine and thus, it is more rapidly available for power when needed. Further, there is less wear on clutches due to restarts.

The auxiliary engine uses only 0.9% of total fuel usage under all around driving conditions (based on idling tests reported herein). For these reasons, it is generally preferable to idle the auxiliary engine (instead of shut it down).

17. If the driver so chooses, he or she may shut down the main engine while the auxiliary engine powers the vehicle. If so, this will result in a small saving of fuel and wear on the main engine.

18. An object is to use the auxiliary engine to restart the main engine and thus there is less wear on the electric starting motor and battery.

19. Many cars today have automatic transmission with torque converter and it provides driver ease and smooth starts. Therefore, an object is to incorporate this device into my two engine power plant and with as few changes as possible.

20. Another object (in FIGS. 1 and 3) is to power the auxiliary engine through an over-running clutch instead of a more complex friction clutch. A related object is to also power the main engine through an over-running clutch as shown in FIG. 3. Again more compact and simpler than a friction clutch.

Unlike Ormsby U.S. Pat. No. 2,290,703, my two engines can each power the vehicle (using over-running clutches) from a dead stop. This simple and compact feature is made possible as subsequently described.

21. Another object (FIGS. 1 and 3) is to provide a locking device 26 to 30 which permits both starting and braking of the auxiliary engine even though it drives through an over-running clutch 19. A related object is to be able to engage and disengage this device "on the fly". In my whole power plant, this device is the most likely to have a problem. Fortunately, it is located on top in the engine compartment where it can be easily worked on, if necessary.

22. The sprockets 23 and 24 are mounted on the outside diameter of clutch hub and torque converter. Such mountings for sprockets save space and cost. Further, such mountings lend themselves to sprockets which are large in diameter thereby increasing life of toothed belt and its power capability. Other advantages of such a drive are: (a) No need to hold precise center distance as with an all gear system, (b) No lube oil needed and this goes right along with the dry outside diameter of present torque converters, and (c) Quiet.

An alternative to the toothed belt is a chain. Easier to install in FIGS. 1 and 3.

23. It is expected that many (not all) city drivers will tend to run on the auxiliary engine along most of the time—so as to save fuel cost. As such, the main engine will be shut down (or idled). The main engine will thus have a longer calendar life than the engine in present automobiles. We would prefer to wear out the auxiliary engine and auxiliary clutch (instead of main engine and main clutch) for the following reasons 24 to 26 inclusive.

24. The auxiliary engine is on top and accessable where it is easy to remove. No need to go underneath. So light, a chain hoist may not be necessary.

25. The auxiliary engine has only two cylinders and thus less cost to overhaul or exchange.

26. The auxiliary clutch is accessable. No need to go under or to drop a heavy greasy transmission. In the case of FIGS. 1 and 3, the auxiliary clutch is merely a sprag type over running clutch and (unlike a friction clutch) it would probably last as long as the vehicle itself.

27. The previous advantages (24 to 26) are made possible because two separate and distinct engines are employed. This is counter to prior art which uses a common cylinder block and/or two crankshafts interconnected (end to end) with a positive jaw clutch.

28. An object is to drive electric alternater, water pump, and air conditioner with either/or both engines. A pulley and belt 45 are provided for this purpose. If this objective were not secured, the vehicle would not fully operational on either/or both engines. Ormsby U.S. Pat. No. 2,290,703 drives water pump from main engine only—see "Discussion of Prior Art".

29. An advantage is that should either engine fail, the driver can (in some cases) use the remaining engine to reach home or a repair shop. Such a feature contributes to safety because a stalled vehicle at the side of a busy highway, freezing isolated road, or criminal neighborhood is an unsafe situation.

30. A cost reducing objective is to use only a single electric starter motor and its associated ring gears.

A related objective is as follows: If the main engine should fail to start (using the electric starter motor), it is still possible (under most situations) to crank over both engines (at the same time) using the same single electric starter motor and therefore start the auxiliary engine. Both engines have their own fuel and ignition systems and therefore the chances of both engines failing to start is much less than with a single engine. Once either engine starts, there is plenty of cranking power to start the other engine (or drive home on one engine, if necessary).

31. My power plant uses two engines and therefore you are concerned about cost. There are still only 6 cylinders, total. The main engine shall last longer as per paragraph 23. For other cost reducing features, refer to paragraphs 5, 11, 12, 20, and 35. For safety and convenience, refer to paragraphs 15, 29, 30, and 33. Also, less air pollution.

32. Another object is to use only one of each of the following items in said motor vehicle: transmission, differential, transaxle torque converter, water pump, radiator, thermostat, fan, exhaust system, electric generator, starter motor, battery, fuel pump, and one electronic controller. However, each engine should have its own lube oil pump, lube system, ignition system, and fuel injection (or carburation) system.

33. An added use is in a recreational camper vehicle. While the camper is parked, drive generator, air conditioner, etc. using only the auxiliary engine.

34. When both engines are powering at the same time, there is a possibility of two cylinders firing at the same time. To relieve a possible problem, the sprocket 23 is made with one or two teeth less than sprocket 24. Thus, if two cylinders should fire at the same time, they will not do so on the next rotation. Keep in mind that powering both engines at the same time occurs only a small fraction of total running time.

35. With my two engine power plant, it appears likely that the transmission could have on less gear ration (less cost) than in a single engine car. This is because when you change displacement (on the fly), it is like changing gear ratio.

BRIEF DESCRIPTION OF DRAWINGS

FIGS. 1 to 8 are for front wheel drive.

FIG. 1 (the first species) is a vertical section view of a two engine power plant. It features friction type main clutch, automatic transmission with torque converter, and over-running clutch for the auxiliary engine.

FIG. 2 is a larger scale cross section view of the main engine shown in FIGS. 1 and 3.

FIG. 3 (the second species) is identical to FIG. 1 except the friction clutch has been replaced with an over-running clutch.

FIG. 4 (the third species) is a vertical section view of a two engine power plant. Most of the parts are identical to (and have same location as) those in an ordinary single engine vehicle.

FIG. 5 is a larger scale view of a portion of FIG. 4. The section is taken at 5—5 in FIG. 4.

FIG. 6 is the same as FIG. 1 except the Vee 4 engine has been replaced with an in-line 4.

FIG. 7 is the same as FIG. 3 except the Vee 4 engine has been replaced with an in-line 4.

FIG. 8 is a small scale end view of FIG. 1 showing optional relocation of the auxiliary engine. Same for other species.

FIG. 6 to 7 need no further description.

DETAILED DESCRIPTION OF FIGS 1 AND 2

Figure 1:
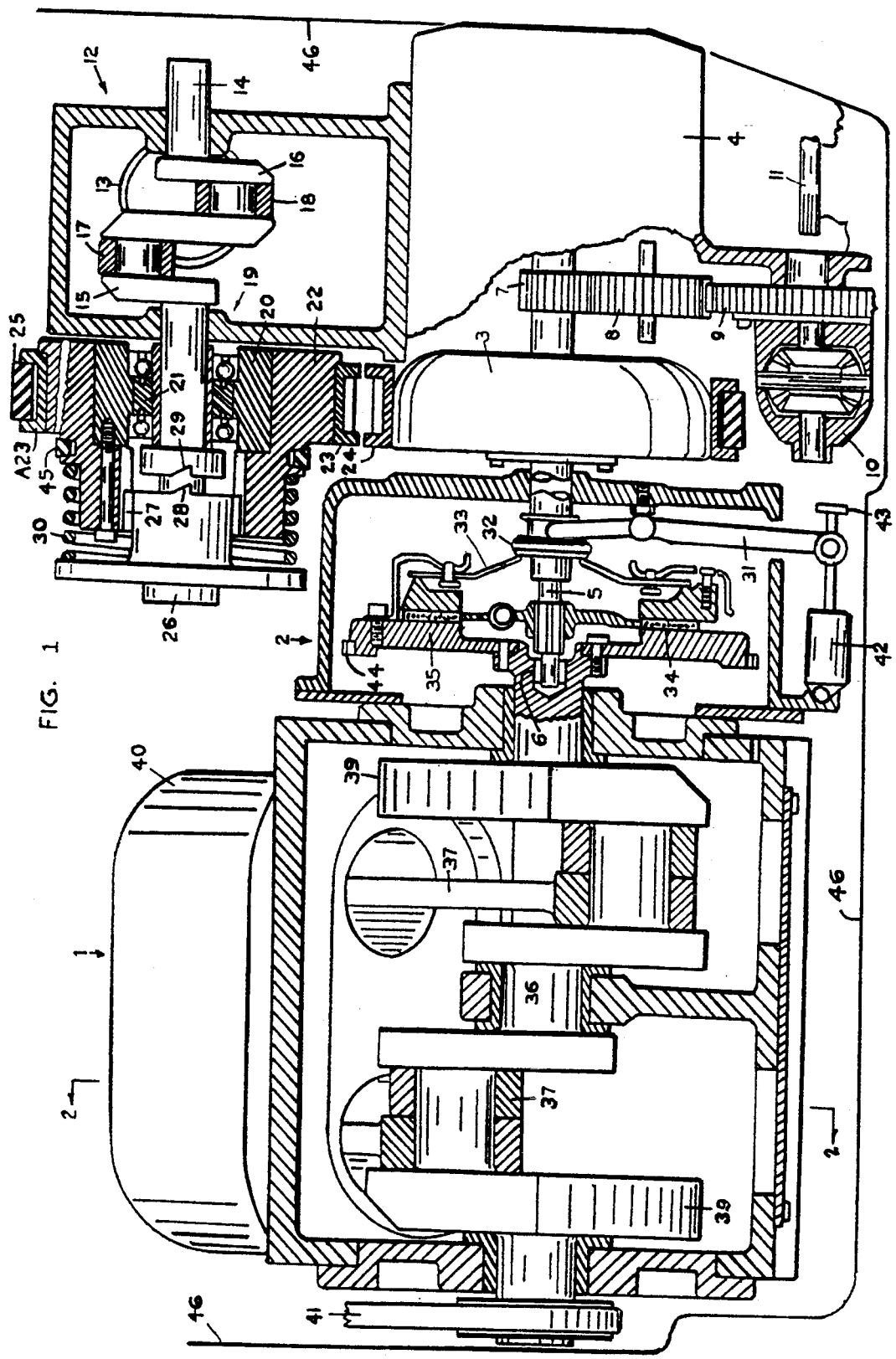

A four cylinder 90 degree Vee engine 1 drives an automotive friction clutch 2 which in turn drives a fluid coupling or torque converter 3. This last item is the ordinary automotive three element type which has blades turning in fluid. In technical terms this is sometimes referred to as "hydro kinetic". The torque converter is part of an ordinary automatic transmission 4. The stub shaft 5 is bolted to the input end of the torque converter; and the stub shaft is piloted at 6 into the end of the main engine crankshaft. The transmission (as usual) contains an output gear 7, and idler gear 8 which drives an ordinary ring gear 9 which in turn drives the differential 10. Drive shafts 11 extend out each side of the differential so as to drive vehicle front wheels. The combination of torque converter, transmission, ring gear, differential, and drive shafts are commonly known as a "transaxle".

Mounted on top of the transmission is an auxiliary engine 12 having two horizontal opposed cylinders 13. The crankshaft 14 has cranks 15 and 16. The con rod big ends 17 and 18 ride on the crank pins. See FIG. 5 for a plan view of a similar engine.

Item 19 is an over-running clutch which consists of an inner race (keyed to the crankshaft) outer race 20, ball bearings and sprags 21. The over-running clutch transmits rotary power in one direction and freewheels the other.

A hub 22 surrounds the outer race and is bolted to same. A sprocket 23 is mounted to the O. D. of the hub and rotates therewith. A similar sprocket 24 is mounted to the O. D. of the torque converter and rotates therewith. A Toothed belt 25 interconnects the two sprockets.

The plunger 26 is splined at 27 to the hub. The plunger has several tapered dogs 28 which engage with tapered slots 29 when the plunger is pushed in. A coil spring 30 retracts the plunger when not engaged.

The main clutch 2 contains the usual lever 31, throw-out bearing 32, diaphram spring 33, splined friction clutch disk 34, and flywheel 35.

Figure 2:
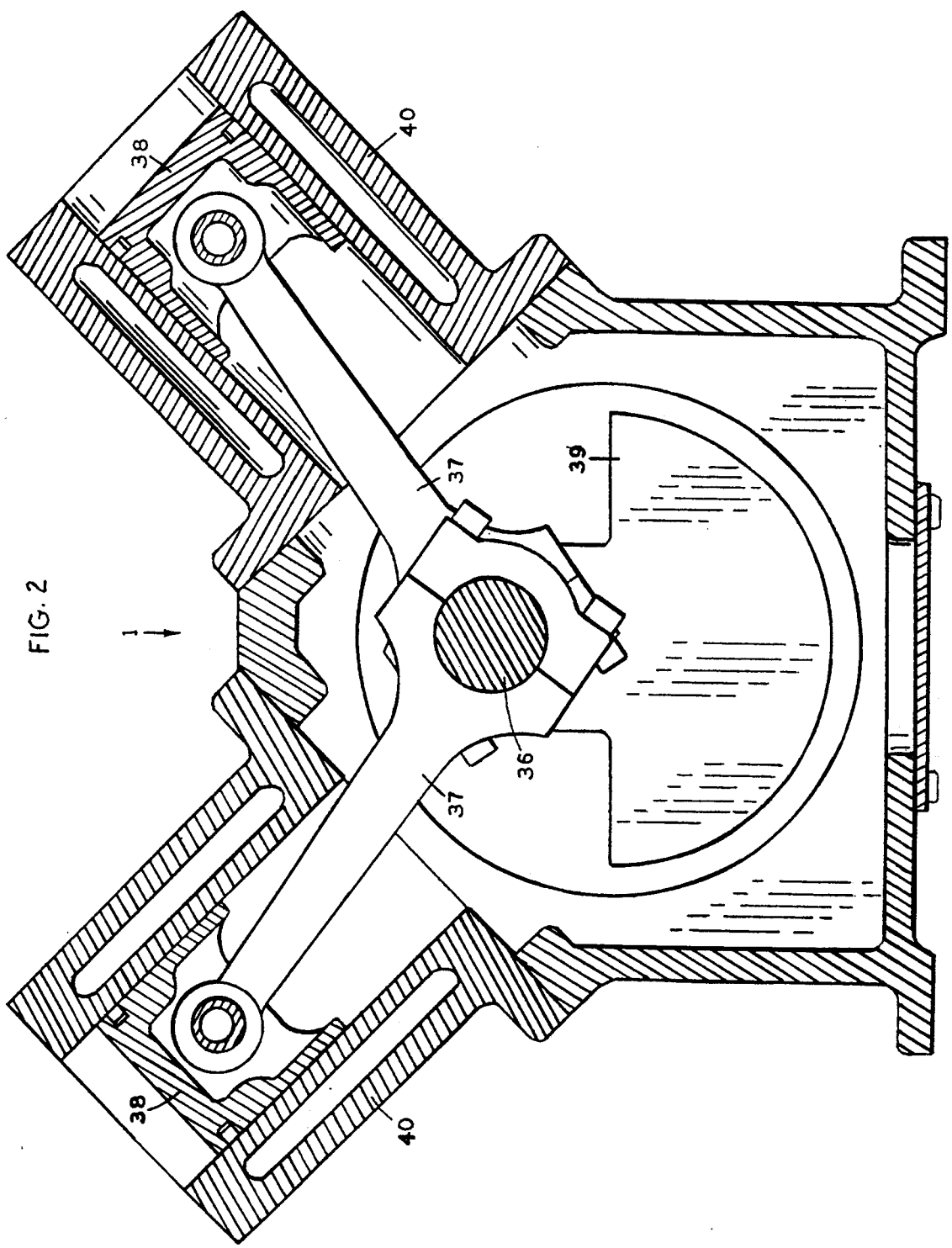

Referring to FIGS. 1 and 2, the main engine 1 is not novel in itself. It is compact in axial length and thus well suited for FIG. 1 where axial space is at a premium (especially where both a friction clutch 2 and torque converter 3 are employed). The engine has the following standard parts: crankshaft 36, connecting rods 7, pistons 38, and counterweights 39. Each pair of water cooled cylinders 40 are cast integral and bolted to the crankcase. A sprocket and toothed belt 41 are for driving cam shafts, water pump, etc. Not shown (for either engine) are cylinder heads, valves, ignition, fuel systems, etc. because these parts are all standard.

OPERATIONS DURING A TRIP

The following narrates various driving conditions and how they are handled. Start both engines as follows: place the usual hand control lever in "PARK". Push plunger 26 inward by means not shown. Keep pressure on the plunger so as to urge it inward. Engage main clutch 2 by means of hydraulic cylinder 42 or foot pedal 43. Turn key to start. An electric starting motor will engage ring gear 44 so as to start rotation of main engine 1, main clutch 2, torque converter 3, sprockets 23 and 24, belt 25 and hub 22. Upon the first few degrees of rotation, the tapered dogs 28 will engage tapered slots 29 so as to rotate crankshaft 14. Both engines are thus cranked over and only one electric starter motor is needed.

The first leg of our trip is in the city so the main engine will be shut down (or idled) and the main clutch 2 disengaged. As an option, the plunger 26 can be left engaged in which case the auxiliary engine will provide the usual engine braking effect when your foot lets up one the gas. Next, place hand control lever in "D", give the auxiliary engine a little gas and we are moving on two cylinders.

At a traffic light, let off the gas and brake to a stop. You don't need to touch the hand lever and the auxiliary engine idles over slowly. It is able to do this even though the over-running clutch 19 has not released, and this is because the torque converter acts like a clutch itself and permits idling. When the traffic turns green, release the brake, give the auxiliary engine a little gas (with foot pedal) and our vehicle pulls smoothly away. This vehicle has two engines, but it is almost like driving an ordinary car.

We are now out of city traffic and would like to cruise at 55 MPH. Our next step is to convert from auxiliary engine to main engine; and we do this "on the fly" without stopping the vehicle. Release plunger 26 and spring 30 snaps it back. Engage main clutch 2 slowly. The main engine will now be started by either of two ways: (a) the auxiliary engine will start the main or (b) power from the wheels will be fed backwards through the torque converter so as to start the main engine. If (b) should prove to be a rapid rough start, the hydraulics of the transmission could be modified to prevent (b). Such a rough start is unlikely because a torque converter has a smooth flow of torque.

As an option, the main engine could have instead been idling—discussed further on. Give the main engine some gas and let off the gas to the auxiliary engine which will now idle. There is no need to worry about disconnecting the auxiliary engine from the drive train because the over-running clutch 19 has automatically taken care of this.

Next, we are running at 45 MPH on a winding canyon road. A slow driver is ahead. Finally we see that the road ahead is clear to pass so here is what you (the driver) do: Apply accelerator pedal to both engines at the same time. (There may be two such pedals depending on control method). The auxiliary engine had already been idling so it will power up right away with no hesitation. When the auxiliary engine reaches the speed of the main engine, the over-running clutch 19 will engage automatically and the two engines will power us past the slower vehicle with plenty of power. This powerful passing mode (with no hesitation or gear shifting) is both a convenience and a safety feature. Unlike the ordinary car, displacement is added for passing or climbing steep hills.

Now that we are safely past that car, let off on the gas to the auxiliary engine (it goes to idle) and we are cruising at 55 MPH on main engine alone.

Next, we come to a steep upgrade hill and need more power. Apply the gas pedal to the main engine. If this is not sufficient, also apply gas pedal to the auxiliary engine. If this is still insufficient, the automatic transmission will (on its own) switch to a lower gear ratio.

Next, we come to a steep downgrade. Keep the main clutch 2 engaged and main engine compression will restrain the wheels. If needed, shift hand lever to "3nd" for more engine braking.

Next, we pull onto the Los Angeles freeway and it is an extremely hot day. There is no wind and a pall of smog has been hanging over the city for days. To our dismay, we encounter a traffic pile up. So then you declutch main engine and shut it clear off. We are now inching along on auxiliary engine. The torque converter is a nice feature here as you don't have to keep working a friction clutch. Our water pump and air conditioner are working because Vee belt 45 drives these from either or both engines. We creep along in air conditioned comfort.

We look at other cars in front and each side of us. These cars have from four to eight cylinders. We are the only car running on only two cylinders and we are consuming fuel at a rate less than half. Yet, our car is medium size. Those big cars are belching noxious exhaust fumes and it hangs in a pall in this canyon freeway.

After a half hour of bumper to bumper traffic we pull off the freeway and this is the end of our trip. We have consumed less fuel than other vehicles as next calculated and tabulated. Further, our transmission has shifted gears fewer times than others.

CALCULATED PERFORMANCE

This calculation is based on a main engine of four cylinders of 3.5 inch stroke and 4 inch bore. The auxiliary engine has two cylinders of 3.5 inch stroke and 4 inch bore. The first part of the calculations are for level road performance running at steady speed with no stops. The results are tabulated as follows:

| | | | CALCULATED PERFORMANCE | | | | | |
|---|---|---|---|---|---|---|---|---|
| CASE | MPH | BMEP | NO OF ACTIVE CYLS. | H.P. | ENG. REVS PER MILE | ENG. RPM | MILES PER GAL. | ROAD CONDITION |
| A | 55 | 38.7 | 6 | 26 | 2200 | 2017 | 21.2 | LEVEL |
| B | 55 | 58 | 4 | 26 | 2200 | 2017 | 22.7 | LEVEL |
| C | 55 | 72.6 | 4 | 26 | 1760 | 1613 | 24.4 | LEVEL |
| D | 55 | 48.4 | 6 | 26 | 1760 | 1613 | 22.3 | LEVEL |
| E | 55 | 96.7 | 2 | 26 | 2640 | 2420 | 24.9 | LEVEL |
| F | 25 | 13.6 | 6 | 5 | 2640 | 1100 | 21.4 | LEVEL |
| G | 25 | 40.9 | 2 | 5 | 2640 | 1100 | 50.8 | LEVEL |
| H | 25 | 20.5 | 4 | 5 | 2640 | 1100 | 35.12 | LEVEL |
| I | 55 | 100 | 4 | 75 | 3686 | 3376 | 8.2 | UP HILL |
| J | 55 | 66.6 | 6 | 75 | 3686 | 3376 | 7.59 | UP HILL |

A sample calculation for CASE A is as follows: Engine HP at 55 MPH for a modern streamlined medium sized automobile of about 3500 LB weight on a level road=26 HP—from various sources. Engine revs per mile=2200. Averaged from "Consumer Reports" magazine, April, 1991. Engine speed=2200×55/60=2017 RPM. Piston speed=2017×3.5×2/12=1176 FT/min. Total piston area=6×0.7854×16=75.4 in². Power strokes per min with 4 stroke cycle=2017/2=1008 B.M.E.P.=HP×33000×12/LAN=26×33000×12/3.5×75.4×1008 =38.7 PSI. Brake specific fuel consumption=0.6 LB/HP HR. Miles/gallon=55×6/26×0.6=21.2 MPG.

CONCLUSIONS ON CALCULATIONS

Compare CASE F vs. CASE G. Here is where two cylinders do the work of six cylinders; and this is where the biggest fuel savings are. The mileage on 2 cylinders is 50.8 MPG and the BMEP is a conservative 40.9 so the engine is not being overworked. This is compared with 21.4 MPG for six cylinders (single engine vehicle).

There is a lot of 25 MPH driving where two cylinders will do just fine. As part of this work, your author rented a three cylinder Geo Metro for two months. With one passenger, we accelerated up a long hill at 55 MPH with power to spare. No vibration or roughness. All around mileage 40 MPG. The Metro has 61 cubic inch displacement. This is compared with my two cylinder auxiliary engine herein which has 88 cubic inches.

If you are apprehensive about driving on only two cylinders, keep in mind that in an instant (on the fly) you can add up to four more cylinders if you need them.

CASE F vs. CASE G. Fuel saving =(50.8−21.4)/21.4=137%.

Figure 9:
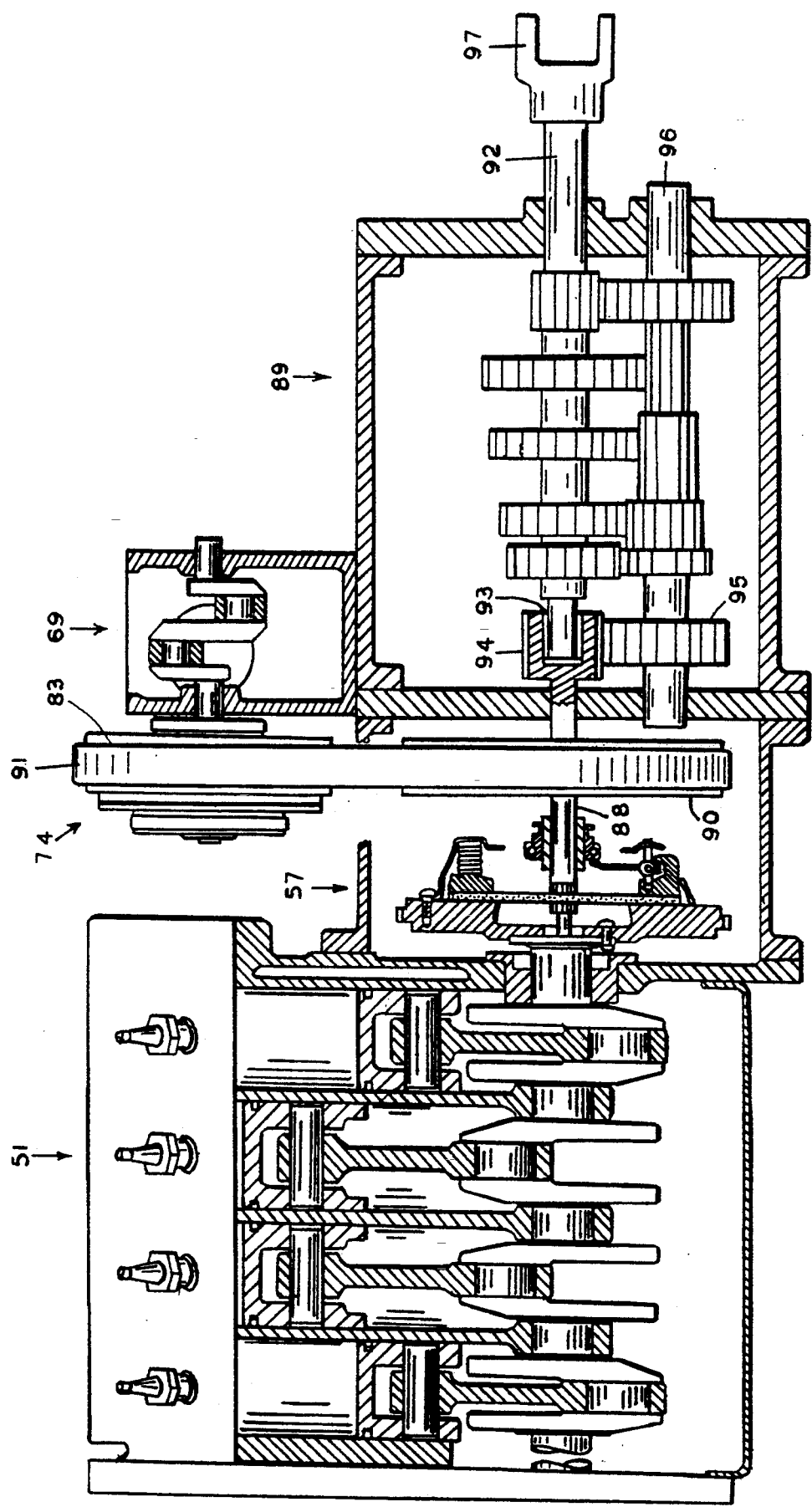
FIG. 9 is for rear wheel drive using a manual transmission.

CASE A vs. CASE C is based (in part) on the proposal that my vehicle can have a higher ratio in high gear than in a single engine car. Such high ratio (in the transmission and/or final drive) is permitted (in my vehicle) because slow city type driving is now powered by the auxiliary engine using low ratio sprockets as shown in FIGS. 8 and 9. A further reason (for the high ratio) is that you always have the option to go to six cylinders (in an instant) if needed. Thus, at 55 MPH (using main engine) there will be a 15% fuel saving due to (a) Higher gear ratio and (b) Run on four cylinders instead of six.

TO IDLE OR SHUT MAIN ENGINE OFF WHILE UNDER WAY

Your author has made several tests (as follows) on actual engines to determine the amount of fuel consumption under idling conditions: The first test was made Aug. 17, 1991 on a 1989 Ford Escort. This vehicle has a four cylinder 1.9 liter engine with manual transmission and electronic fuel injection into a throttle body. Outside air temperature 56° F. Engine tachometer read 900 RPM; and this was the lowest RPM I could get by releasing accelerator pedal rapidly. Fuel used in a one hour idling test was 535 milliliters (0.14 gal.) of no lead gasoline. Fuel was measured by filling the tank before and after to the very top of the inlet pipe; and without stopping the engine. That 900 RPM seemed high. Therefore, your author went to the local Ford dealer to see if it could be reduced. The shop foreman said 900 RPM was normal and that there was no adjustment to reduce that; so I did not pursue that matter further.

In a second idling test, the tachometer of a 6 cylinder carbureted small tractor engine read 400 RPM with no effort to reduce it further. That engine ran very smoothly at 400 RPM with no tendency to stall.

In a third idling test, a 1978 Ford straight six of 300 cubic inch displacement and manual transmission used 1500 milliliters (0.39 gal.) of gasoline in one hour. In this test, the transmission was placed in neutral and the foot pedal for the clutch was blocked in the disengaged position.

CONCLUSIONS ON IDLE OR SHUT DOWN (a) Assume 450 RPM idle speed for both engines.

(b) If you shut down the auxiliary engine (instead of idle), the fuel saving is calculated to be 0.9% of total fuel usage under all around average driving conditions. Therefore, it does not appear worthwhile to shut down the auxiliary engine (although it could be done).

(c) If you shut down the main engine (instead of idle), the fuel saving is calculated to be 1.8% of total fuel usage under all around average driving conditions.

(d) In view of the preceeding, many drivers may choose (at times) to idle both engines so as to take advantage of the more rapid response for added power when needed.

(e) Some city drivers may choose to run all day on just the auxiliary engine (For fuel economy). In that case, shut the main engine down.

(f) The preceeding paragraphs (b) and (c) pertain only to shut down vs. idle and should not be confused with overall fuel savings in my two engine system as set forth in the calculated tabulation.

DETAILED DESCRIPTION OF FIG. 3

This Figure is identical to FIG. 1 except the main friction clutch 2 has been replaced with a sprag type over-running clutch 47. The inner race 48 (for the sprags) is keyed to stub shaft 49. A larger pilot bearing 50 (roller) has been added. Identical parts common to FIGS. 1 and 3 are given the same numbers.

Figure 3:
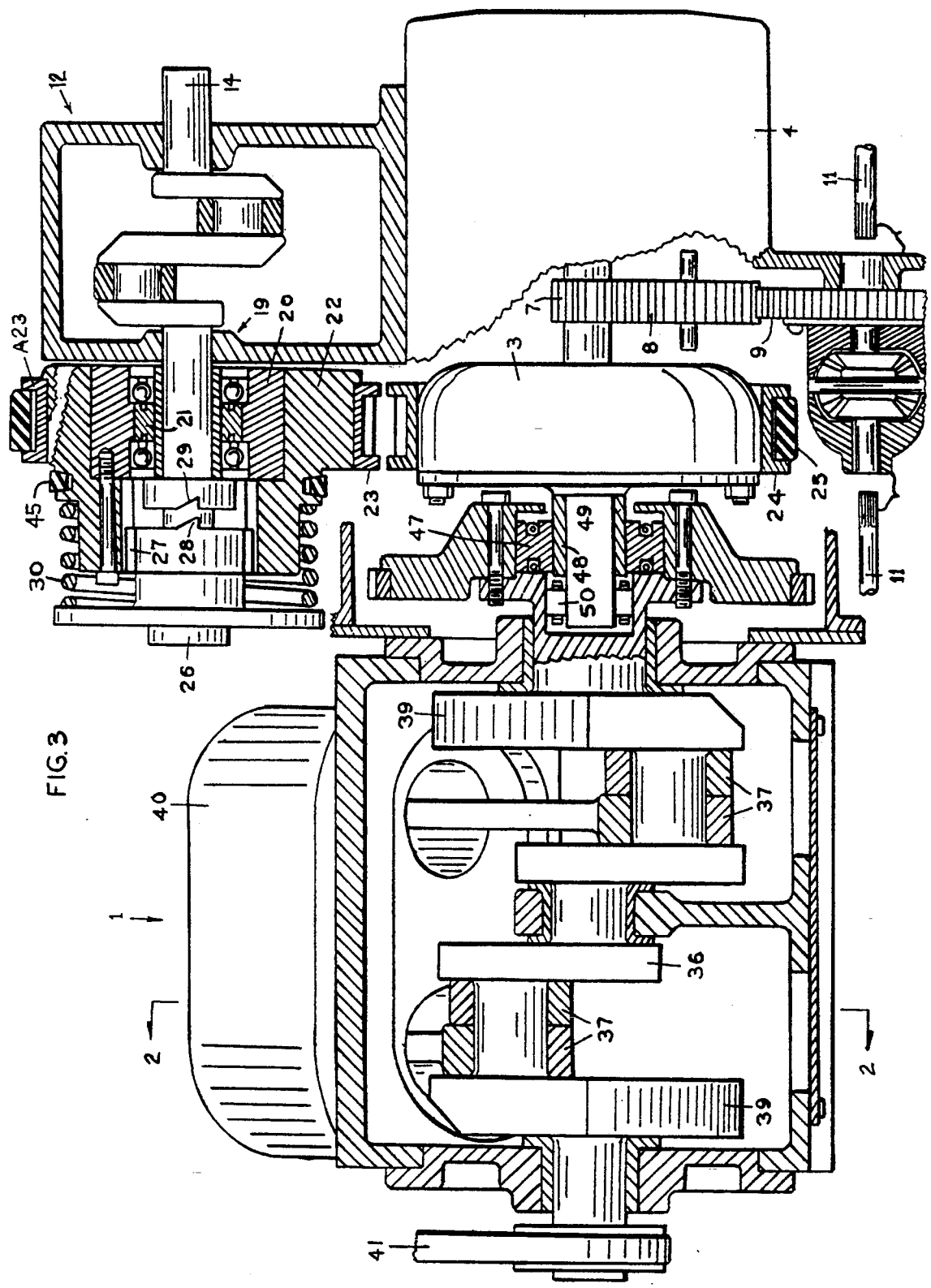

Operation of FIG. 3 is as follows: Engage plunger 26. Start both engines at the same time with the single electric starter motor. Release plunger 26.

You are powering on auxiliary engine alone and the main engine is idling. You need more power. Gas the main engine and let off on the auxiliary. The main engine applies more power with no hesitation, shifting of gears, or friction clutch operation.

You are accelerating up a steep hill and need more power than the main engine can provide. Gas the auxiliary. Again no hesitation or gear shifting.

The FIG. 3 construction is more compact, simpler, and lower cost than FIG. 1. Further, the response time (to change number of active cylinders) is faster. In FIG. 3, the main engine cannot be restarted by means of the auxiliary engine; and therefore, (under average driving conditions) the main engine will be idled when not under power. If, however, the car is going to be operated all day on its auxiliary engine, then shut main engine down.

A drawback to FIG. 3 is that the main engine cannot provide braking effort as shown. However, the auxiliary engine is capable of braking—with plunger 26 left in the engaged position. If necessary, the plunger 26 can be engaged "on the fly" as follows: (a) Reduce the speed of the main engine to idle. (b) Power the auxiliary engine slightly so it is actually propelling the vehicle and thus sprag clutch 19 is in the engaged position and thus there is no relative motion between parts 28 and 29. (c) Engage plunger 26. Automatic controls should be provided for this procedure so as to prevent tooth impact and consequent damage.

DETAILED DESCRIPTION OF FIGS 4 AND 5

The main engine 51 has four in-line cylinders 52 with pistons 53, con rods 54, crankshaft 55, and spark plugs 56. The main engine drives an ordinary friction clutch 57 with friction disk 58, pressure plate 59, coil springs 60, throw out bearing 61, flywheel 62, and starter ring gear 63. Coupled to the clutch is a four speed manual transmission 64 and its parts are: input shaft 65, countershaft 66, output gear 67, and reverse gear 68. Also, shown are the other usual gears and shifters.

An auxiliary engine 69 (mounted on top of the transmission) is two cylinder horizontal opposed. The two throw crankshaft 70 drives two con rods 71 and two recip pistons 72 in water cooled cylinders 73. Cylinder heads, valves, ignition, etc. are not shown for either engine as these are standard items.

Mounted on the end of crankshaft 70 is a friction clutch 74. See FIG. 5, too. The friction disk 75 is splined to the crankshaft. Pressure plate 76 is pressed into the pulley/flywheel housing 77. Movable pressure plate 78 is splined to the pulley housing. Diaphram spring 79 holds the pressure plate tightly against disk 75. The throw out bearing 80 actuates pins 81 which in turn push against heavy washer 82, which in turn bears against the diaphragm spring so as to disengage the clutch.

A sprocket 83 is mounted to the O.D. of the housing. A second sprocket 84 is mounted on and rotates with input shaft 65. Toothed belt 85 interconnects the two sprockets for power transmission. When clutch is disengaged and crankshaft not rotating, the pulley housing rotates freely on ball bearings shown. Vee belts 86 and 87 are for driving generator, water pump, etc. from either or both engines.

Figure 4:
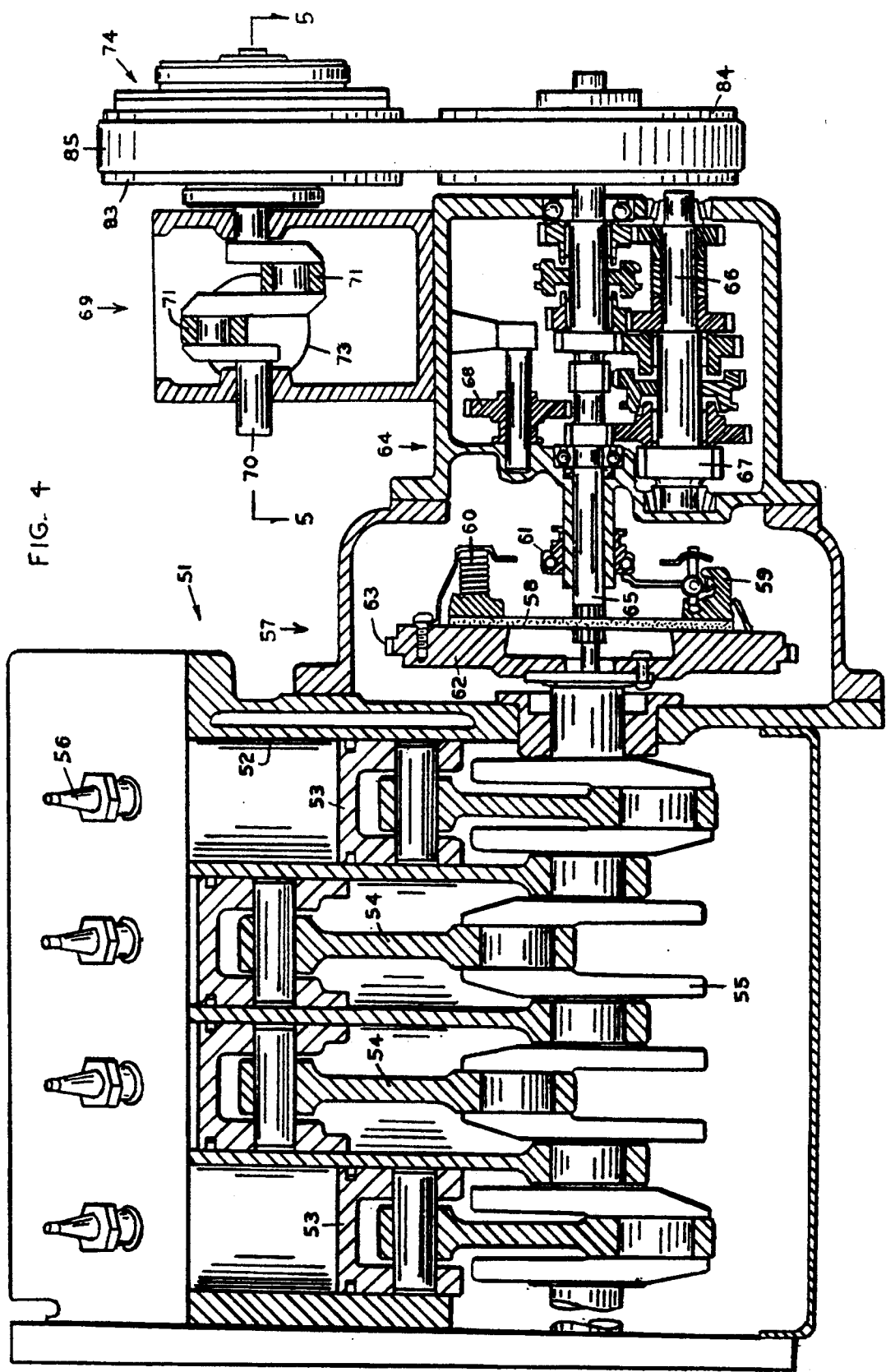

A prime feature of FIG. 4 is that the engine 51, clutch 57, and transmission 64, are standard items in existing automobiles. Further, these parts are in their original locations in the engine compartments. This means therefore that the only major additions (for two engine operation) are the auxiliary engine 69, clutch 74, sprockets, and belt. Your author has examined a number of existing cars and retrofit appears possible (at least for a test vehicle). There will be some "shoe horning" involved.

Figure 5:
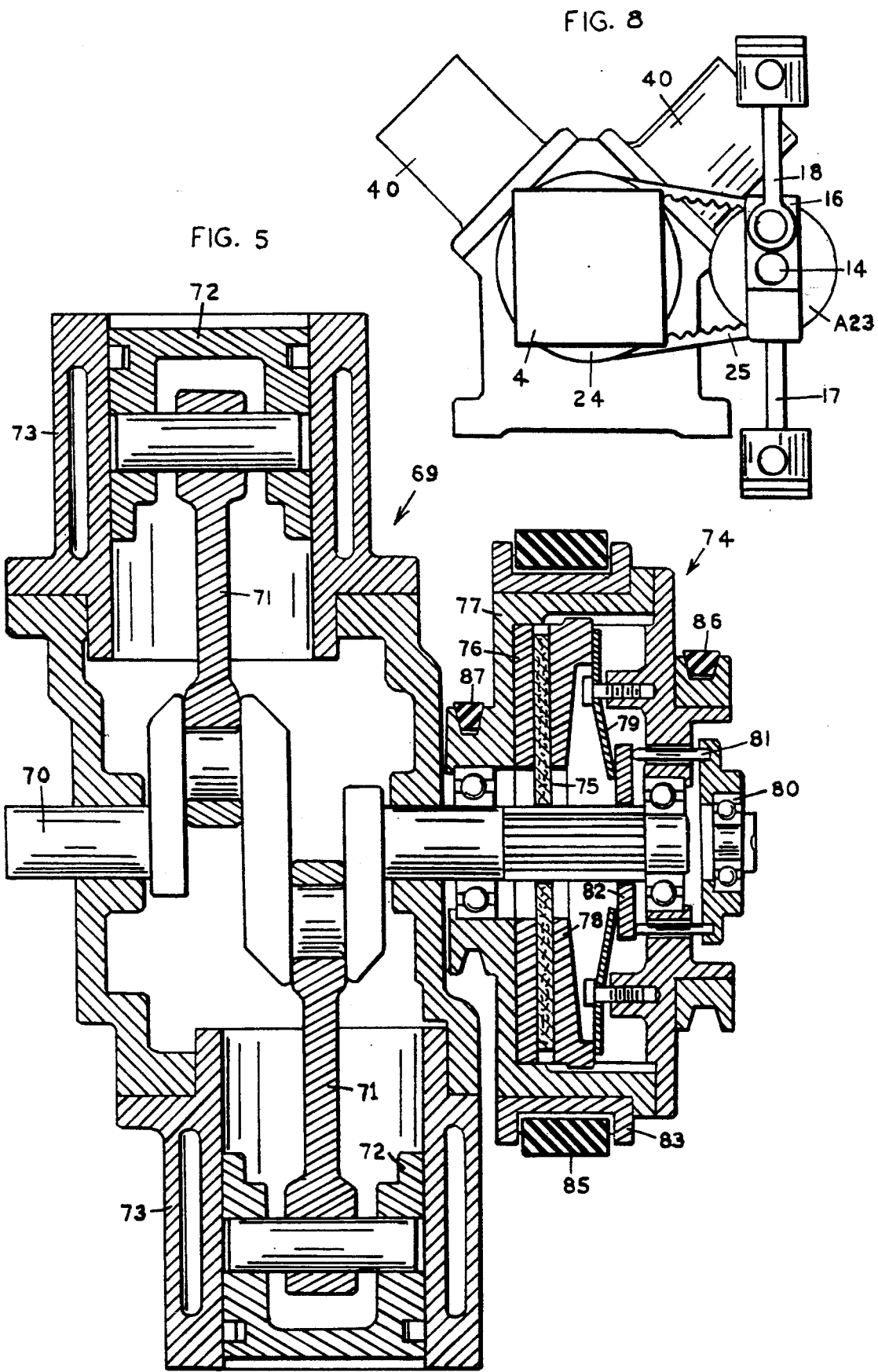
Figure 6:
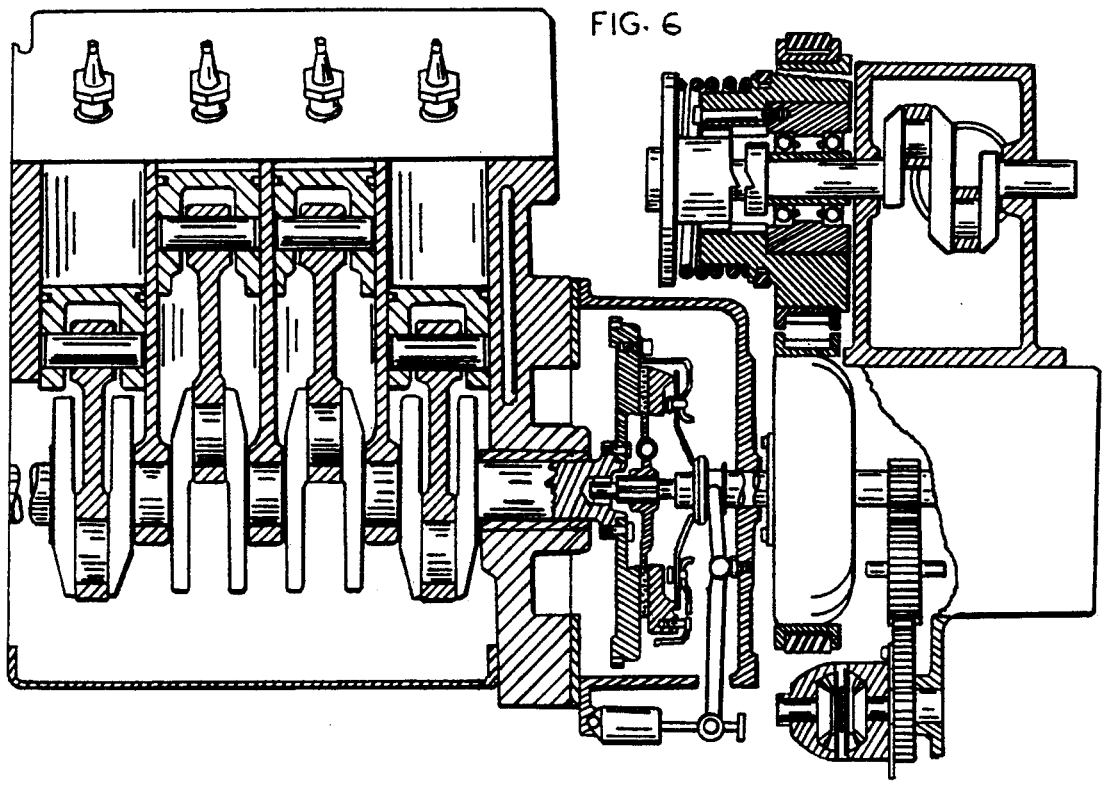
Figure 7:
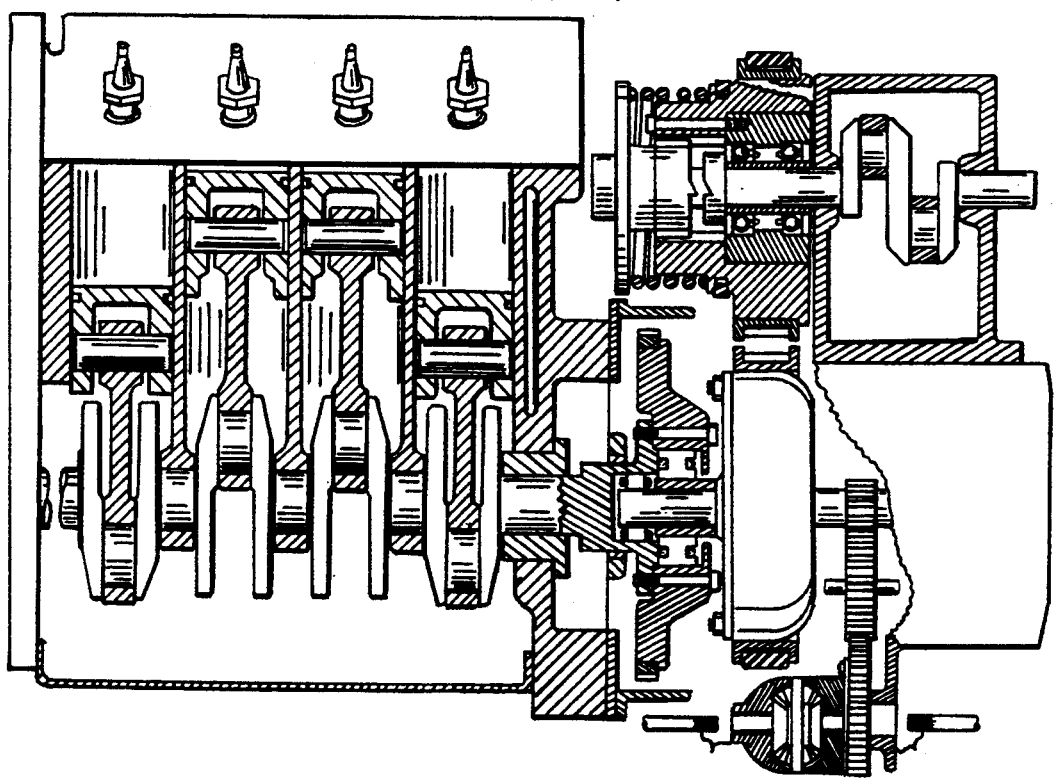

Operation of FIGS. 4 and 5 is similar to FIGS. 1 to 3 except there are two controllable friction clutches and no over-running clutches. Both systems have their pros and cons.

DETAILED DESCRIPTION OF FIG. 8

This is a small scale end view of FIG. 1 in which the auxiliary engine has been shifted to the side of the transmission (a less preferred location). For clearness, only the crankshaft 14, connecting rods 17–18, and pistons of the auxiliary engine are shown. A feature in FIG. 8 has to do with sprockets as follows: You are driving in the city at 25 MPH, on the auxiliary engine. The transmission 4 is an automatic and it has (by itself) shifted to high gear. The sprocket 23A is smaller than sprocket 24 and this gives a lower drive ratio for the auxiliary engine. This permits the auxiliary engine to rev up faster and thus permits more rapid acceleration and without the chugging action of a vehicle running too slow at too high a gear ratio (especially when running on only two cylinders). The same sprockets and belt (with the lower ratio) will also come in handy as an assist for hill climbing and passing. As an option, use the same low ratio sprockets in all the species herein.

DETAILED DESCRIPTION OF FIG. 9—REAR WHEEL DRIVE

Many parts in FIG. 9 are identical to those in FIGS. 4 and 5; and such parts are given the same reference numbers. Main engine 51 drives main clutch 57. Clutch shaft 88 drives manual transmission 89. Auxiliary engine 69 (with clutch 74 and sprocket 83) is mounted on top of transmission 89. A sprocket 90 is keyed to shaft 88. Toothed belt 91 interdrives the two sprockets. The sprocket 90 has a larger diameter than sprocket 83 so as to provide a speed reduction—the advantages of which were described for FIG. 8. Transmission shaft 92 is piloted (with sleeve bearing 93) into clutch shaft 88. The gears 94 and 95 drive lay shaft 96. The various other gears shown are all standard. The standard shifter synchronizers are not illustrated. Item 97 is part of a universal joint leading to the rear wheels. Either or both engines can drive the vehicle. A nice feature here is that the clutch shaft 88 serves a double function. It conveys shaft power from main clutch to transmission, and also provides a convenient drive location for sprocket 90.

This FIG. 9 will probably make the easiest retrofit conversion (from an existing single engine vehicle) since the only changes to the drive line are: weld a 2 inch extension into the center of clutch shaft 88, move transmission 89 rearward two inches, and shorten the final drive shaft two inches.

DETAILED DESCRIPTION OF FIG. 10—REAR WHEEL DRIVE

Figure 10:
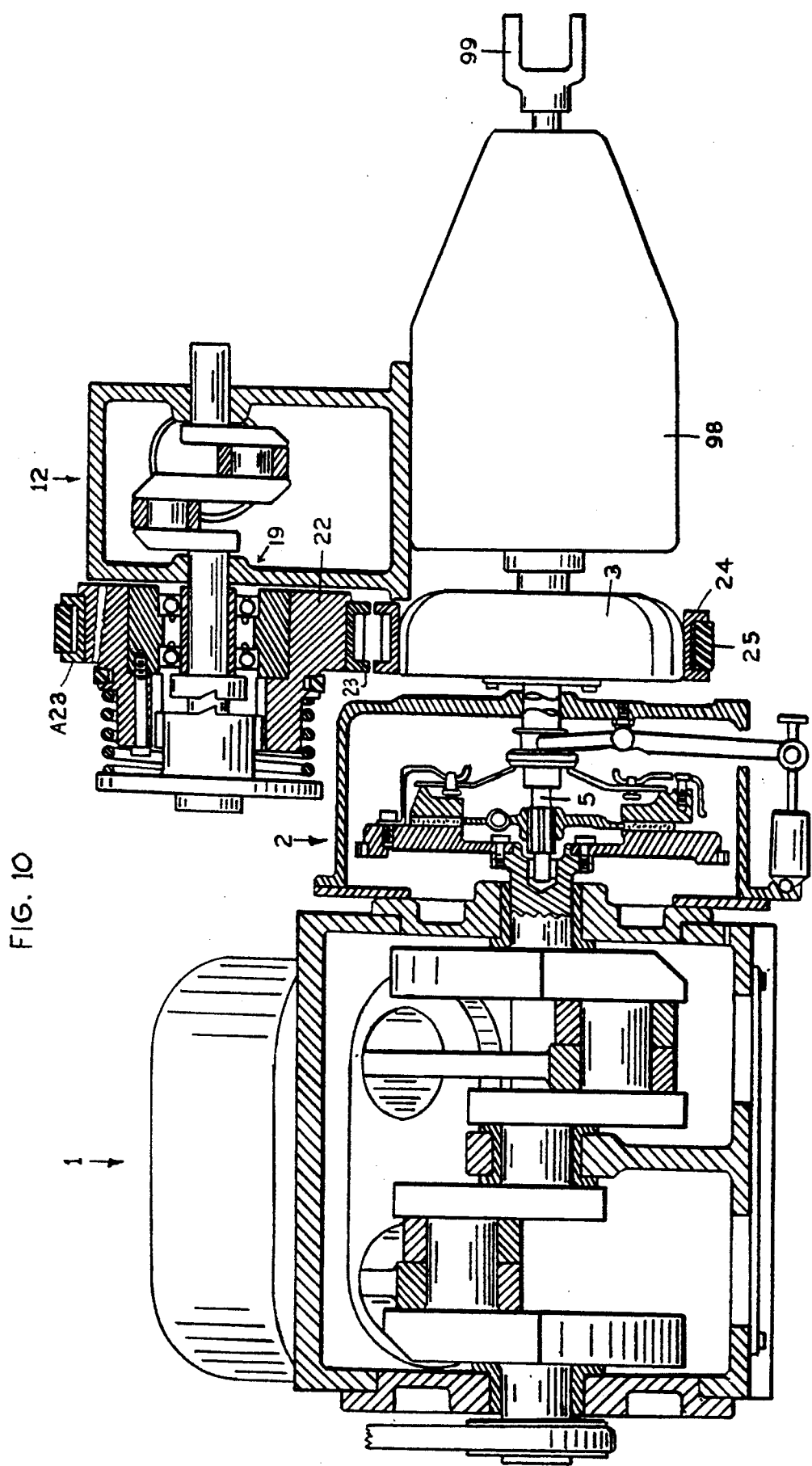
FIG. 10 is for rear wheel drive using an automatic transmission.

Most of the parts of FIG. 10 are identical to those in FIGS. 1 and 3; and such parts are given the same reference numbers. Main engine 1 drives automatic transmission 98 via main clutch 2, stub shaft 5, and torque converter 3. Auxiliary engine 12 drives transmission 98 via over-running clutch 19, hub 22, sprockets 23-24, toothed belt 25, and torque converter 3. Item 99 is part of a universal joint for drive shaft leasing (as usual) to differential and rear wheels.

Operation of FIG. 10 is identical to FIG. 1 except for rear wheel drive.

MODIFICATIONS NOT SHOWN

All species illustrate two sprockets and a toothed belt. However, such drive could also be two sprockets and a chain; or it could be two pulleys and belts. Therefore, some of the claims use the word "pulley" and this is a generic term. If the pulley has teeth on it, then its more specific name is sprocket and it is used with a chain or toothed belt. The term "endless flexible element" is a generic name which includes chain, belts, and toothed belts.

A torque converter is a specific class of fluid coupling. All the preceeding definitions shall apply to and have the same meaning in the appended claims.

Other possible (less preferred) engines are Vee 6, three cylinder in-line, and two cy linder in-line.

Other possible clutches are: oil flooded friction, piston actuated friction, electromagnetic, over-running wrapped spring, hydrostatic, dry powder or shot against wavy disk, and Electro-Rheological Fluid (ERF).

The locking mechanism 26 to 30 could be replaced by a friction clutch such as shown at 74 in FIG. 5. In this case the sprags 21 would be placed around the crankshaft and just to the left of clutch disk 75. In this case the sprag clutch and the friction clutch would operate in parallel such that either or both could drive.

ADDENDUM

Referring to FIGS. 1 and 3, the top half A23 of the sprocket is illustrated smaller than bottom half 23. This is to illustrate an option. That is, the sprocket can be small A23 or larger 23. An object and advantage here is that the preferred A23 version is smaller than sprocket 24 and thus a speed reducer (torque increaser) is provided. See FIG. 8 for same speed reducer. This will permit engine 12 to rev up faster and accelerate faster in 25 MPH city type traffic—as was more completely described in "CASE A vs CASE C".

Referring to FIG. 1, the line 46 illustrates the engine compartment which encloses my two engine power plant.

It is understood that various modifications of my inventions may be made and my invention is only limited by the scope of the appended claims.

I claim:

1. In an engine and transmission system for powering a motor vehicle, the combination of; a main engine and an auxiliary engine, both said engines being of the internal combustion type, said two engines being separate from each other and each engine having its own engine block and crankcase, said main engine having main crankshaft, said auxiliary engine having auxiliary crankshaft, both said engines having power cylinders and reciprocable pistons, said main engine having substantially more piston displacement than said auxiliary engine, a main clutch coupled to said main crankshaft and rotatable therewith, said main clutch being selectively operable, a multi-ratio transmission having an input shaft, said main engine serving to drive said multi-ratio transmission via said main clutch and via said input shaft, said main crankshaft and said main clutch and said input shaft all being substantially coaxial, power transmission means coupling said auxiliary crankshaft and said multi-ratio transmission, an auxiliary clutch interposed for driving relationship between said auxiliary crankshaft and said multi-ratio transmission, said auxiliary engine serving to drive said multi-ratio transmission via said auxiliary clutch and via said power transmission means, a differential driven by said multi-ratio transmission, drive shafts extending from said differential, said drive shafts serving to drive the front wheels of said motor vehicle, and wherein the improvement is the following in combination; said auxiliary engine being laterally offset from said main engine, said auxiliary crankshaft being located with its axis of rotation laterally offset from that of said main crankshaft and also laterally offset from said input shaft, said auxiliary engine and its crankcase being located adjacent said multi-ratio transmission, said auxiliary crankshaft being located (in its longitudinal position) such that a plane passing perpendicular through the auxiliary crankshaft also passes through said multi-ratio transmission, said main engine and main clutch and multi-ratio transmission being all mounted transversely in said motor vehicle, engine compartment for said main engine and said main clutch and said multi-ratio transmission and said auxiliary engine, and the maximum width of engine compartment being substantially limited by the width of said motor vehicle.

2. The combination specified in claim 1 wherein said auxiliary engine has two opposed cylinders.

3. The combination specified in claim 2 wherein said two opposed cylinders are horizontally disposed.

4. The combination specified in claim 1 wherein said auxiliary engine drives said transmission by means of two pulleys and an endless flexible element trained over said pulleys for power transmission between pulleys.

5. In a power plant for powering a motor vehicle, the combination of: a main engine and an auxiliary engine, both said engines being of the internal combustion type, each engine having its own cylinders and reciprocable pistons, said main engine having main crankshaft, said auxiliary engine having auxiliary crankshaft, said main engine having at least three cylinders, said auxiliary engine having less piston displacement than said main engine, a main clutch direct coupled to said main crankshaft and rotatable therewith, a multi-ratio transmission having an input shaft, said main engine serving to drive said multi-ratio transmission via said main clutch and via said input shaft, said main clutch being selective so as to engage and disengage, said main crankshaft and said main clutch and said input shaft all being substantially coaxial, the axis of said auxiliary crankshaft being laterally offset from the axis of said main crankshaft, and wherein the improvement comprises the following in combination;

said two engines being separate from each other and each engine having its own engine block and crankcase, said auxiliary engine being located to one side of said multi-ratio transmission and thus the overall length of said power plant is shortened, an auxiliary clutch attached to said auxiliary crankshaft and rotatable therewith, a first pulley attached to the output side of said auxiliary clutch and rotatable therewith, a second pulley serving to drive said input shaft, a flexible element trained over said two pulleys so that each pulley can drive the other pulley, and said auxiliary engine serving to drive said multi-ratio transmission via said auxiliary clutch and via said pulleys.

6. The combination specified in claim 5 wherein said second pulley is smaller in diameter than said first pulley so as to provide a speed reduction and torque increase when said auxiliary engine is powering the vehicle.

7. In an engine and transmission system for powering a motor vehicle, the combination of: a main engine and an auxiliary engine, both of said engines being of the internal combustion type, said auxiliary engine being separate from and laterally offset from said main engine, each engine having its own engine block and crankcase, each engine having it own crankshaft and reciprocable pistons, a main clutch coupled to and rotatable with said main engine crankshaft, a fluid coupling connected to and rotatable with said main clutch, a multi-ratio transmission, said fluid coupling being interposed between said main clutch and said multi-ratio transmission, said main engine serving to drive said multi-ratio transmission via said main clutch and via said fluid coupling, a first pulley attached to and rotatable with said fluid coupling, a second pulley coupled to and rotatable with the crankshaft of said auxiliary engine, a flexible element trained over said two pulleys for power transmission between pulleys, said auxiliary engine serving to drive said multi-ratio transmission via said pulleys and via said flexible element and via said fluid coupling, and wherein the improvement is; said first pulley being mounted directly to and surrounding said fluid coupling.

8. The combination specified in claim 7 wherein said pulleys are sprockets and wherein said flexible element is a toothed belt.

9. The combination specified in claim 7 wherein an auxiliary clutch is mounted on and rotates with the crankshaft of said auxiliary engine, and wherein said second pulley is attached to and rotates with said auxiliary clutch.

10. The combination recited in claim 7 wherein the casing of said fluid coupling supports said first pulley and becomes a hub for the pulley.

11. In an engine and transmission system for powering a motor vehicle, the combination of; a main engine and an auxiliary engine, both of said engines being of the internal combustion type, said two engines being separate from each other and each engine having its own engine block and crankcase, said main engine having main crankshaft, said auxiliary engine having auxiliary crankshaft, both said engines having power cylinders and reciprocable pistons, said main engine having substantially more piston displacement than said auxiliary engine, a main clutch coupled to said main engine crankshaft and rotatable therewith, a multi-ratio transmission, said multi-ratio transmission having an input shaft, said main engine crankshaft and said main clutch and said input shaft (to the multi-ratio transmission) all being substantially coaxial, power transmitting means interconnecting said auxiliary engine and said multi-ratio transmission, an auxiliary clutch interposed for driving relationship between said auxiliary engine and said multi-ratio transmission, said auxiliary engine serving to drive said multi-ratio transmission via said auxiliary clutch and via said power transmitting means, each engine being capable (by itself) of powering said motor vehicle, said two engines being capable of simultaneously powering said motor vehicle, and wherein the improvement is the following in combination: said auxiliary engine being laterally offset from said main engine with the auxiliary engine crankshaft being laterally offset from the main engine crankshaft, and said auxiliary engine being located directly above said multi-ratio transmission.

12. The combination recited in claim 11 wherein said auxiliary engine is the type known as two cylinder horizontal opposed.

13. The combination specified in claim 11 wherein said main engine has exactly four working cylinders and four working pistons.

14. The combination specified in claim 13 wherein said four cylinders are in a Vee 4 arrangement.

15. The combination recited in claim 11 wherein: said input shaft is part of said multi-ratio transmission and extends through the transmission, said multi-ratio transmission also having a countershaft, said multi-ratio transmission having multi-ratio gearing mounted on said two shafts, said input shaft serving to drive said countershaft via said multi-ratio gearing, one end of said input shaft being attached to said main clutch and rotatable therewith, a power transmitting wheel attached to the other end of said input shaft and rotatable therewith, a second power transmitting wheel attached to said auxiliary crankshaft and rotatable therewith, said two wheels serving to transmit rotary power from said auxiliary crankshaft to said input shaft, and said two wheels being components of said power transmitting means.

16. The combination recited in claim 11 wherein; said power transmitting means consists of a first pulley and a second pulley and a flexible element trained over said two pulleys, said first pulley being attached to and rotatable with said auxiliary crankshaft, said second pulley being mounted on and rotatable with said input shaft, said second pulley having an axial location which is between said main clutch and said multi-ratio transmission, said multi-ratio transmission having a lay shaft laterally offset from the axis of said input shaft, and said input shaft serving to drive said lay shaft via gearing.

17. In a power plant for powering a motor vehicle, the combination of; a main engine and an auxiliary engine, both said engines being of the internal combustion type, said two engines being separate from each other and each engine having its own crankcase and cylinder block, each engine having its own reciprocable pistons, said main engine having main crankshaft, said auxiliary engine having auxiliary crankshaft,

- a main clutch direct coupled to said main crankshaft and rotatable therewith, a fluid coupling driven by said main clutch, said main clutch serving to engage and disengage the fluid coupling to and from the main crankshaft, a multi-ratio transmission having an input shaft, said fluid coupling being interposed for driving relationship between said main clutch and said input shaft,
- said main crankshaft and said main clutch and said fluid coupling and said input shaft all being substantially coaxial, said main engine serving to drive said multi-ratio transmission via said main clutch and via said fluid coupling,
- said auxiliary engine and its crankshaft being laterally offset from said main engine and its crankshaft, the axis of said auxiliary crankshaft being laterally offset from the axis of said main crankshaft,
- an auxiliary clutch rotatable with said auxiliary crankshaft,
- power transmitting means interconnecting said auxiliary clutch and said fluid coupling,
- and wherein the improvement is the following in combination: said auxiliary clutch being substantially coaxial with said auxiliary crankshaft, said auxiliary clutch is further defined as being an over-running type clutch, said auxiliary engine serving to drive said multi-ratio transmission via said over-running type auxiliary clutch and via said fluid coupling,
- said over-running type auxiliary clutch serving to over-run when the vehicle is powered by main engine alone and thus permitting the auxiliary engine to idle during this mode of operation, said over-running type auxiliary clutch serving to engage when the vehicle is powered by both engines simultaneously, said over-running type auxiliary clutch serving to engage when the vehicle is powered by the auxiliary engine alone, and wherein said auxiliary engine is capable (by itself) of propelling said vehicle from a dead stop due to the slip action of said fluid coupling.

18. The combination specified in claim 17 wherein said fluid coupling is further specified to be a torque converter.

19. The combination recited in claim 17 wherein said main clutch is further defined as being an over-running type,
- said over-running type main clutch serving to engage when the vehicle is powered by main engine alone, said over-running type main clutch serving to engage when the vehicle is powered by both engines simultaneously, said over-running type main clutch serving to disengage when the vehicle is powered by the auxiliary engine alone, and wherein said main engine is capable (by itself) of propelling said vehicle from a dead stop due to the slip action of said fluid coupling.

20. In a power plant for powering a motor vehicle, the combination of; a main engine and an auxiliary engine, both said engines being of the intenal combustion type, said two engines being separate from each other and each engine having its own crankcase and cylinder block, each engine having its own reciprocable pistons, said main engine having main crankshaft, said auxiliary engine having auxiliary crankshaft, a main clutch direct coupled to said main crankshaft and rotatable therewith, a multi-ratio transmission, said multi-ratio transmission having an input shaft, a fluid coupling interposed for driving relationship between said main clutch and the input shaft of said multi-ratio transmission, said main engine serving to drive said multi-ratio transmission via said main clutch and via said fluid coupling, said main clutch serving to engage and disengage said main engine to and from said fluid coupling, said auxiliary engine and its crankshaft being laterally offset from said main engine and its crankshaft, the axis of said auxiliary crankshaft being laterally offset from the axis of said main crankshaft,

- an auxiliary clutch having an input side and an output side, said input side of the auxiliary clutch being attached to said auxiliary crankshaft and rotatable therewith,
- a first pulley attached to the output side of said auxiliary clutch and rotatable therewith, a second pulley, a flexible element trained over said two pulleys so that said two pulleys drive each other,
- and wherein the improvement comprises the following in combination;
- said main engine having at least three working cylinders, said main crankshaft and said main clutch and said fluid coupling and said input shaft (to the multi-ratio transmission) all being substantially coaxial,
- said auxiliary engine being located to one side of said multi-ratio transmission and thus the overall length of said power plant is shortened,
- said second pulley being attached to and rotatable with the input side of said fluid coupling, said auxiliary engine serving to drive said multi-ratio transmission via said auxiliary clutch and via said two pulleys and via said fluid coupling,
- and wherein said power plant is for use in a front wheel drive vehicle with the power plant mounted transversely and wherein axial space for the power plant is limited by the width of said vehicle, a differential gear set with axles extending therefrom for front wheel drive, and said differential gear set being driven by said multi-ratio transmission.

21. The combination recited in claim 20 wherein said main engine has four cylinders mounted in Vee 4 formation for the purpose of adequate power when highway cruising and for compact axial length so as to permit transverse mounting in the motor vehicle, and for smooth running of the main engine.

* * * * *